US 6,616,833 B2

(12) United States Patent
Lynch (10) Patent No.: US 6,616,833 B2
(45) Date of Patent: Sep. 9, 2003

(54) SHIP-BOARD SYSTEM FOR DECONTAMINATING WASTEWATER CONTAMINATED BY FIREFIGHTING OPERATIONS

(76) Inventor: Gerard Lynch, 12 Linberger Dr., Bridgewater, NJ (US) 08807

(*) Notice: Subject to any disclaimer, the term of this patent is extended or adjusted under 35 U.S.C. 154(b) by 0 days.

(21) Appl. No.: 09/836,922

(22) Filed: Apr. 18, 2001

(65) Prior Publication Data

US 2002/0153324 A1 Oct. 24, 2002

(51) Int. Cl.[7] .............................................. B01D 1/00
(52) U.S. Cl. ................... 210/96.1; 210/195.1; 210/241; 210/254; 210/257.1; 210/259; 210/266; 210/284
(58) Field of Search ................. 210/662, 663, 210/669, 688, 691, 693, 96.1, 241, 257.1, 259, 266, 284, 103, 195.1, 254

(56) References Cited

U.S. PATENT DOCUMENTS

| RE27,210 E | 11/1971 | McMinn et al. ............... 96/167 |
|---|---|---|
| 3,937,662 A | 2/1976 | Bartik ......................... 210/649 |
| 3,974,940 A | 8/1976 | Bartik ............................ 222/52 |
| 4,066,545 A | 1/1978 | Walters et al. ............... 210/739 |
| 4,071,445 A | 1/1978 | Katayama et al. ........... 210/655 |
| 4,121,993 A | 10/1978 | Krugmann ................... 204/270 |
| 4,308,139 A | * 12/1981 | Piepho ........................ 210/241 |
| 4,536,286 A | 8/1985 | Nugent ....................... 210/202 |
| 4,572,786 A | 2/1986 | Endo ........................... 210/188 |
| 4,659,460 A | * 4/1987 | Muller et al. ................ 210/241 |
| 4,836,921 A | * 6/1989 | Hahn et al. .................. 210/241 |
| 4,846,976 A | 7/1989 | Ford ........................... 210/636 |
| 4,886,607 A | 12/1989 | Lalonde et al. ............. 210/739 |
| 4,892,664 A | 1/1990 | Miller ......................... 210/747 |
| 5,069,779 A | * 12/1991 | Brown et al. .................. 210/87 |
| 5,091,081 A | * 2/1992 | Hilgren .................... 210/195.2 |
| 5,122,165 A | 6/1992 | Wang et al. .................... 95/92 |
| 5,122,166 A | 6/1992 | Hyrcyk et al. ................ 95/141 |
| 5,139,679 A | 8/1992 | Pan et al. .................... 210/656 |
| 5,176,798 A | 1/1993 | Rodden ....................... 202/159 |
| 5,254,253 A | 10/1993 | Behmann .................... 210/607 |
| 5,388,542 A | 2/1995 | Fischer et al. .......... 114/183 R |
| 5,451,320 A | 9/1995 | Wamg et al. ............... 210/604 |
| 5,474,672 A | 12/1995 | Peterson et al. .............. 210/85 |
| 5,498,346 A | 3/1996 | Hadfield et al. ............ 210/739 |
| 5,552,051 A | 9/1996 | Wang et al. ................ 210/604 |
| 5,577,522 A | 11/1996 | Barkley et al. ............. 134/111 |
| 5,626,746 A | 5/1997 | Rose .......................... 210/109 |
| 5,637,221 A | 6/1997 | Coyne ........................ 210/608 |
| 5,807,485 A | 9/1998 | Caplan et al. .............. 210/610 |
| 5,908,040 A | 6/1999 | Defraites, Jr. ................ 134/10 |
| 5,932,112 A | 8/1999 | Browning, Jr. ............. 210/750 |

* cited by examiner

Primary Examiner—Ivars Cintins
(74) Attorney, Agent, or Firm—Selitto, Behr & Kim (57) ABSTRACT

A water pollution remediation system includes a plurality of decontamination modules that are self supporting and interconnectable for sequentially removing a plurality of different contaminants. The modules are designed to be independently transportable to a ship for decontaminating bilge water, in particular, after a fire when a foaming fire suppressant composition has been introduced into the bilge water. The modules may be placed on the deck of the ship, connected together and powered by the ship's hydraulic, electric and bilge pumping systems to provide comprehensive decontamination.

15 Claims, 8 Drawing Sheets

SHIP-BOARD SYSTEM FOR DECONTAMINATING WASTEWATER CONTAMINATED BY FIREFIGHTING OPERATIONS

FIELD OF THE INVENTION

The present invention relates to a system for treating bilge water that has been contaminated by wastewater generated by ship-board fire-fighting operations.

BACKGROUND OF THE INVENTION

Various types of contaminants are found in the ballast and bilge water of ships as the result of routine on-board ship operations including, but not limited to, equipment and deck cleaning, laundry cleaning, food preparation and the use of on-board showers and sinks. These routine operations cause contamination of the bilge water with various size particles of dirt and rock, oil and detergents. Detergents typically include a combination of organic compounds, volatile organic compounds and halogens. In addition to the foregoing routine activities, fires and associated fire-fighting activities occasionally occur on-board requiring the use of firehoses through which are ejected high volumes of water that drains into the ship bilges. Water used to suppress fires washes significant volumes of the combustibles (upon which it is sprayed to put the fire out) down to the bilge, including petrochemical fuels, paint residues and any of the various cargo or byproducts of their combustion that may be carried on ships. In addition, firefighting water frequently is augmented with foaming fire suppressant chemical compositions, such as aqueous film-forming foams ("AFFF"). AFFF is a well-known, water soluble mixture of fluorochemical surfactants, hydrocarbon surfactants and solvents. AFFF is often provided in a 3% solution with water specifically for use in fighting fires in many environments, including on board ships.

Accordingly, routine ship-board operations, as well as accidents, spills and fire-fighting activities, result in the presence of an almost unlimited variety of chemical contaminants to be present in bilge water, including benzene, toluene, ethylene, xylene, oil, grease, chloroform, nitrates, nitrogen, lead, zinc, cadmium, tin, mercury, nickel, copper, arsenic, selenium, chromium, diethylene glycol butyl ether, sodium nitrate, triethanolamine, and 1H-benzotriazole. The discharge of wastewater containing the foregoing contaminants into the ocean, or into land-based treatment facilities, is strictly regulated by federal and state governmental agencies, as well as by foreign countries and the international community. Accordingly, there has been a need for processes and systems that remove such contaminants from shipboard wastewater and which are compact and lightweight enough to be operated on-board ships.

As the result of the above-described circumstances, various on-board wastewater treatment systems have been developed, some of which tend to focus on certain categories of contaminants. For example, the bilge water treatment system that is disclosed in U.S. Pat. No. 4,066,545 focuses on the separation of oil from bilge water. U.S. Pat. No. 5,498,346 discloses a system that utilizes cyclones to physically separate oil from wastewater during oil spill cleanup operations.

The ship-board system disclosed by U.S. Pat. No. 4,846,976 focuses on the removal of oil, grease, and insoluble solids from contaminated bilge and wastewater and discloses a filtration system suitable for use on small ships to treat wastewater containing an emulsion of water, oil or fat, an emulsifying agent and insoluble solid material. While the disclosure of U.S. Pat. No. 4,846,976 mentions that detergents are introduced into ship ballast tanks and bilges from fire foams and other sources, the purpose of the filtration system disclosed in U.S. Pat. No. 4,846,976 is to remove only the insoluble solids and the oil, leaving the detergents and firefighting foam contaminants in the wastewater. In addition, it can be noted that since the date of issue of U.S. Pat. No. 4,846,976, wastewater discharge regulations have become more stringent, resulting in a need for a process that can also remove the detergent chemicals, as well as a greater portion of the solids, oils and other contaminants.

U.S. Pat. No. 4,071,445, on the other hand, discloses a system that is designed to treat on-board wastewater that is contaminated with sewage-type waste (i.e, "black water"), as well as by wastewater from showers, kitchen facilities, etc. (i.e., "grey water"). U.S. Pat. No. 4,071,445 is directed to installations on small ships that are primarily focused on reducing biological oxygen demand (BOD), suspended solids (SS), coliform bacteria, as well as other debris and larger solids.

Similarly, the method and apparatus disclosed in U.S. Pat. No. 5,254,253 are designed to remove biological contaminants, in addition to oil and grease, from shipboard waste or bilge water. The method of U.S. Pat. No. 5,254,253 combines on-board black water (raw sewage), grey water (wastewater from showers, kitchen facilities, etc.) and bilge water (containing oil and grease) in an aerated, on-board membrane-bioreactor system where microbes digest the various biological, organic and oily contaminants.

In contrast to the above-described bioreactor system, U.S. Pat. No. 5,932,112 discloses an on-board method and apparatus to kill unwanted aerobic and anaerobic microbes in bilge water by alternately removing and introducing oxygen into the wastewater.

U.S. Pat. No. 5,139,679 discloses a method to decontaminate bilge water that is contaminated with citric acid, triethanolamine and heavy metals. Such contamination occurs when cleaning agents, commonly consisting of solutions of citric acid and triethanolamine, are used to remove old paint and rust from bilges. More specifically, the method of U.S. Pat. No. 5,139,679 treats such contaminated bilge water with hydrogen peroxide and ultraviolet light in the presence of a ferrous ion catalyst, which results in the destruction and decomposition of citric acid and triethanolamine. The chemical decomposition of citric acid and triethanolamine, in turn, prevents the heavy metal contaminants from forming chelated compounds, thereby permitting their subsequent removal by conventional precipitation methods involving pH-adjusting methods.

Notwithstanding the development of the foregoing on-board wastewater treatment systems, there remains a need for a bilge water treatment system that can more effectively remove or reduce a greater variety of contaminants from contaminated bilge water. For example, known bilge water treatment systems do not remove AFFF or its chemical constituents. Furthermore, the above-discussed wastewater treatment systems do not remove multiple categories of contaminants, i.e., solids, AFFF constituents, organic and volatile organic contaminants, solvents, oil and metals, but are more narrowly focused to treat or remove a more specific category of contaminants. In addition, the concentration and variety of contaminants that must be removed from wastewater, prior to legal discharge or disposal is significantly greater than it was just five or ten years ago, due to more stringent regulatory standards. Accordingly, there is a need for a comprehensive wastewater treatment system that removes, or reduces to acceptable levels, multiple categories of contaminants, but that is still highly portable and easily assembled for operation on board ships. As described hereinafter, the present invention addresses the foregoing shortcomings of the prior art.

SUMMARY OF THE INVENTION

The problems and disadvantages associated with known apparatus and methods for decontaminating water at a site of a reservoir holding contaminated water are solved by the apparatus of the present invention which includes a plurality of water processing modules, each having an independent support structure for holding at least one associated water processing device in an position suitable for transport to and operation at the site of the reservoir holding the contaminated water. The at least one associated water processing device of each of the plurality of modules is selectively and removeably hydraulically connectable to another of the associated water processing devices to define a continuous flow path extending from an inlet to the apparatus into which contaminated water flows, through said apparatus to an outlet from which decontaminated water is discharged. Each of the at least one associated water processing devices has an associated decontamination function for at least partially removing a contaminant from a flow of the contaminated water passed sequentially through the of modules along the flow path.

The method of the present invention for removing various contaminants from a volume of contaminated water contained in a reservoir, comprises the steps of providing a plurality of water processing modules, each having an independent support structure for holding at least one associated water processing device in a position that is suitable for transport to, and operation at, the site of the reservoir holding the contaminated water, the associated water processing device of each of the modules being selectively and removeably hydraulically connectable to another associated water processing device of another of the modules to define a continuous flow path extending from an inlet of the apparatus, into which contaminated water flows, through the apparatus, to an outlet from which decontaminated water is discharged, each of the associated water processing devices having an associated decontamination function for at least partially removing a contaminant from a flow of the contaminated water passed sequentially through the plurality of modules along the flow path; transporting the plurality of modules to a position proximate to the reservoir; placing the modules on a support surface in a selected relative juxtaposition; connecting the water processing devices to configure the flow path; operating the apparatus to remove contaminants from the contaminated water; disconnecting the water processing devices; and removing the modules from the site.

BRIEF DESCRIPTION OF THE DRAWINGS

For a better understanding of the present invention, reference is made to the following detailed description of the preferred embodiment considered in conjunction with the accompanying drawings, in which.

DETAILED DESCRIPTION OF THE INVENTION

While the present invention has wide applicability for the treatment and/or decontamination of wastewater from many sources in various locations, it is especially suitable for the ship-board treatment and decontamination of bilge water that has been contaminated by shipboard operations, including but not limited to on-board firefighting activities. Accordingly, the present invention will be described hereinafter in connection with a water treatment system that is designed to be portable, easily and quickly assembled and operated on-board a ship for the purpose of decontaminating bilge water that has been contaminated by firefighting activities, as well as other more routine ship-board activities such as cleaning, cooking, showering, etc. It is intended to be understood that the present invention may also be adapted for the treatment and/or decontamination of wastewater on ships of various sizes, as well as for decontaminating wastewater delivered from ships to land-based water treatment facilities or decontaminating wastewater from various land-based sources.

In addition, although it is envisioned that the present invention will exist initially in a disassembled state prior to deployment ship-board, to facilitate an understanding of the overall structure and inter-relationship of the various components of the present invention, the following detailed description of the preferred embodiment is a description of the apparatus of the present invention in its assembled state. Thereafter, a discussion is provided of the organization of the various components that facilitate quick and easy assembly and disassembly of the apparatus, which organization is considered part of the present invention. Lastly, a description of the operation of the apparatus of the present invention is provided.

General Characteristics of the Present Invention

Figure 1:
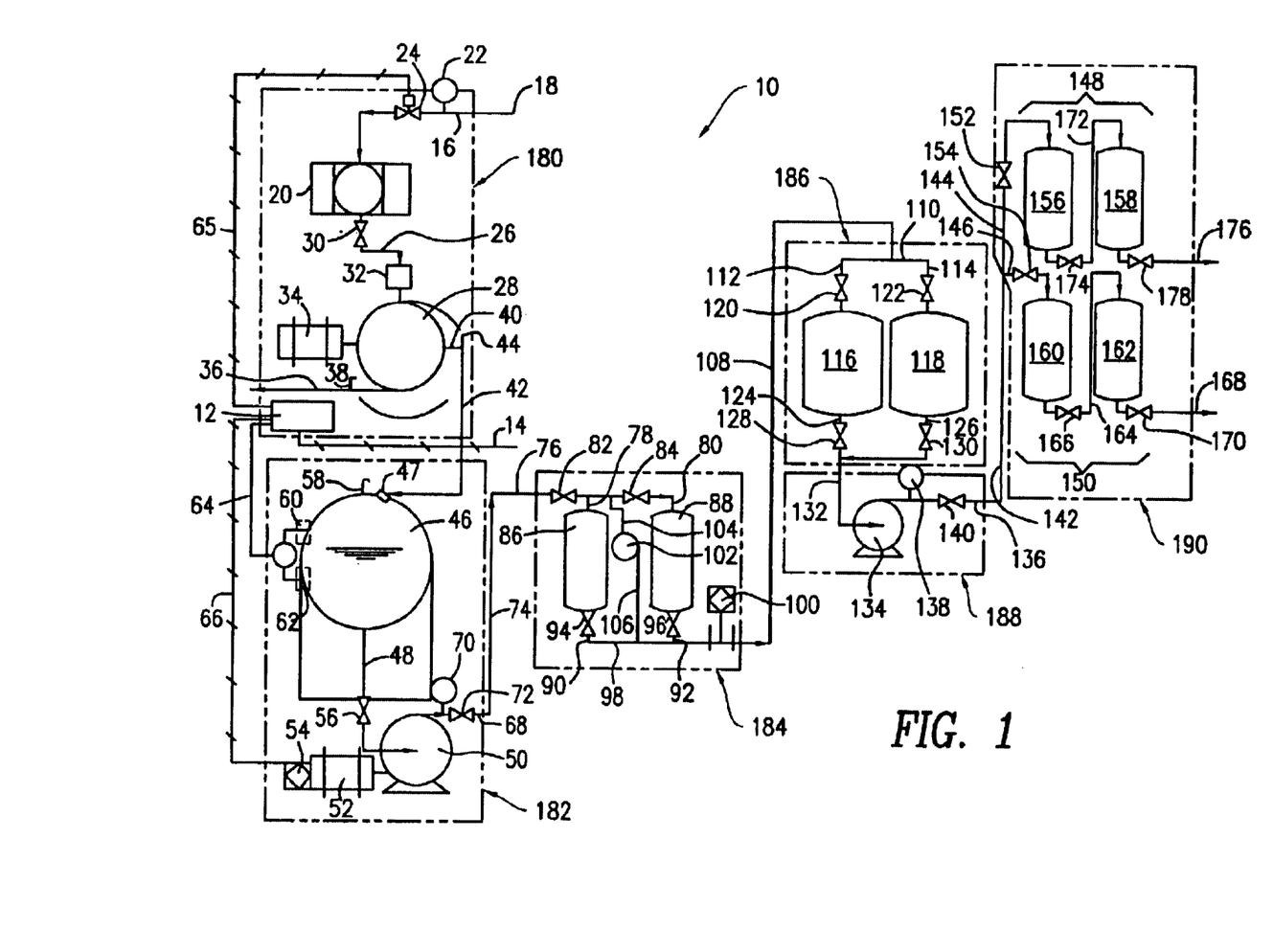
FIG. 1 is a schematic representation of a wastewater decontamination system in accordance with an exemplary embodiment of the present invention, showing the major components of the system.

With reference to FIG. 1, a schematic representation of the bilge water decontamination system 10 of the present invention is provided to show the sequential and associative organization of the components of the present invention. The system 10 is designed to operate as a batch process system with the capacity to process and decontaminate up to one million gallons of bilge water within approximately three and a half days of continuous operation. Furthermore, the system 10 is designed to decontaminate the bilge water by removing or reducing specific contaminants such that any quantities remaining in the bilge water will meet or exceed the open water discharge standards established by the U.S. Environmental Protection Agency as of the year 2000. As will be explained in further detail below, the components of the system 10 are organized and grouped in a manner that achieves the sequential removal or reduction of certain categories of contaminants from the bilge water.

It should be noted that the components that are included in the system 10 are generally conventional, well-known and commercially available physical and chemical processing apparatus. In general, the preferred embodiment of the system 10 is designed for an overall system flow rate of two hundred U.S. gallons per minute (200 USGPM), a system pressure of up to one hundred pounds per square inch (100 psi) and a system temperature of up to one hundred degrees Fahrenheit (100° F.). Additionally, with specific reference to the preferred embodiment described hereinafter, all of the piping and valve equipment that is included in the system 10 meets the U.S. Coast Guard and A.B.S. Rules for Class II piping, as well as in accordance with the American National Standards Institute / ASME Code B31.1 standards. The vessels, such as the tanks and filter housings described below and which are included in the preferred embodiment of the system 10, are designed in accordance with ASME Section VIII Div. 1 specifications. Lastly, all electrical connections and components utilized in the system 10 are explosion proof with a rating of NEMA 7 (National Electrical Manufacturers Association classification 7).

Major Components of the Present Invention

With reference still to FIG. 1, the structure of the system 10 will now be discussed. More specifically, as shown in FIG. 1, the system 10 includes a control panel 12 having an input power line 14. The control panel 12 is designed for 110/220 volts at 50/60 hertz, single phase. The control panel 12 is also connected by electrical lines to a number of other parts of the system 10, as will be discussed in due course hereinafter.

The system 10 has an inlet conduit 16 with an open end 18 that is connected to the ship's pumping system, for pumping the contaminated bilge water into the system 10. The inlet conduit 16 preferably has an outer diameter of approximately four inches, is made of schedule 40 stainless steel and discharges into a conventional strainer 20. In general, it is preferred that all conduits (piping) connecting the various components of the system 10 be fabricated from corrosion-resistant material. The conduit dimensions are selected to match the flow rate required.

A pressure gauge 22 is connected to the inlet conduit 16, proximate to the open end 18 thereof, for the purpose of measuring the system inlet pressure. An air solenoid valve 24 is also provided on the inlet conduit 16 downstream of, but proximate to, the pressure gauge 22 for the purpose of regulating the flow rate of the bilge water into the system 10.

The strainer 20 is a conventional four-inch duplex basket type strainer, Model 51, that is publicly available from commercial suppliers such as Hayward Industrial Products of Elizabeth, N.J. The strainer 20 removes large solids, such as rocks and other debris, of approximately one-sixteenth of an inch in diameter or larger, from the bilge water. The strainer 20 discharges into a separator conduit 26, which is attached to the inlet of a conventional centrifugal oil-water separator 28. A throttle valve 30 is attached to the separator conduit 26, proximate to the strainer 20, for the purpose of controlling the flow rate of the bilge water out of the strainer 20. A totalizer/flowmeter 32 is also attached to the separator conduit 26, downstream of the throttle valve 30, for measuring the flow rate of the bilge water after it passes through the throttle valve 30 and before it enters the oil-water separator 28.

While not specifically shown to avoid an overly complicated diagram, all electrically controllable valves and system monitoring components, such as the totalizer/flowmeter 32, may be connected to the control panel 12 for centralized monitoring and control. Control of the system 10 may also be handled programmatically, in whole or in part, by a computer. Because the system 10 processes volatile compounds, hydraulic or compressed air actuators and controls may be interposed between electric controls and the controlled components to avoid fires.

The oil-water separator 28 is a conventional centrifugal type phase separator and removes the majority of the oil (e.g., lubricating oil, diesel fuel, gasoline, grease, as well as lighter hydrocarbons, such as benzene, toluene, ethylene and xylene) from the bilge water. For example, an centrifugal oil-water separator known as Model V-20, which is publicly available from CINC of Carson City, Nev., is used in a preferred embodiment of the present invention, but any similar oil-water separator can be used. A hydraulic motor 34 powers the oil-water separator 28 and can be detached from the oil-water separator 28 during transportation, as will be discussed in further detail hereinafter. The oil-water separator 28 has a first outlet (not shown) discharging to an oily waste conduit 36 connected thereto for conducting the waste oil (i.e., light phase liquid) to an oil waste tank for storage and later disposal (not shown). The oily waste conduit 36 has a vent 38 to prevent the dangerous accumulation of volatile organic vapors. The oil-water separator 28 is also provided with a second outlet (not shown) for discharging the bilge water (the heavy phase liquid) to the having a short conduit 40 connected thereto.

A flexible conduit 42 is connected to the conduit 40 to conduct the substantially oil-free bilge water away from the oil-water separator 28 and to the next processing component. The flexible conduit 42 is preferably made of marine grade cargo rubber hose and has a diameter of approximately four inches. While a rigid conduit could be employed, e.g., for the conduit 42, the use of a flexible conduit allows the various modular subassemblies (which are described in further detail hereinafter) to be more readily connected with greater freedom as to their relative juxtaposition, proximity and orientation. Given that the system 10 will be used on various ships, having different deck topologies and designs, the freedom to arrange the modular subassemblies in a variety of configurations is particularly beneficial. A vent 44 is provided proximate to where the conduit 40 and the flexible conduit 42 are connected to one another, for the purpose of preventing the dangerous accumulation of volatile organic vapors within the conduits 40, 42.

Flexible conduit 42 connects to the inlet of a conventional atmospheric transfer tank 46, e.g., a five hundred gallon tank, having a diameter of approximately forty-eight inches, which is commercially available from Sigma Design, Inc. of Springfield, N.J. A hydro-sieve 47 is positioned and attached inside the transfer tank 46, at the inlet thereof, such that as the bilge water exits the flexible conduit 42, it must pass through the hydro-sieve 47, preferably perpendicular thereto, before entering the transfer tank 46. The hydro-sieve 47 is configured to conform to the inlet of the transfer tank 46 and is disposed at an angle of approximately sixty degrees above the horizontal direction, which is defined as being parallel to the horizon. The hydro-sieve 47 is publicly available from Sigma Design, Inc. of Springfield, N.J. It is further noted that the hydro-sieve 47 is made of conventional stainless steel well screen material that is publicly available from Leem Filtration of Mahwah, N.J. The purpose of the hydro-sieve 47 is to encourage any foaming or emulsion agents in the bilge water to emulsify into foam on the hydro-sieve 47, as well as to remove additional suspended solids from the bilge water. The resulting foam is then removed from the hydro-sieve 47 by gravity and collected in a collection container (not shown) that is positioned proximate to the inlet of the transfer tank 46 for the purposing of catching the foam. Depending upon where the ship is located, e.g., on the open ocean, environmental laws may permit the foam to be jettisoned overboard.

The transfer tank 46 discharges to conduit 48, which communicates with a transfer pump 50. The transfer pump 50 is powered by a hydraulic motor 52 controlled by a solenoid valve 54, which regulates the supply of hydraulic power to the hydraulic motor 52. A valve 56 on the conduit 48 controls the flow rate of the bilge water entering the transfer pump 50 from the transfer tank 46. The transfer tank 46 has a vent 58 to prevent the accumulation of volatile organic vapors within the transfer tank 46.

The transfer tank 46 has a high level switch 60 and a low level switch 62, each of which are depicted schematically by boxes in dofted lines and which detect the level of bilge water in the transfer tank 46 during operation of the system 10. The high and low level switches 60, 62 are connected by an electrical line 64 to the control panel 12. (The air solenoid valve 24 on the inlet conduit 16 and the solenoid valve 54 on the hydraulic motor 52 of the transfer pump 50 are also each connected by electrical lines 65, 66 to the control panel 12.) As will be discussed in further detail hereinafter, the high level and low level switches 60, 62 signal the control panel 12 in the event the bilge water level in the transfer tank 46 exceeds or falls below predetermined safe levels. Based upon the information the control panel 12 receives from the high and low level switches 60, 62, the control panel 12 signals the air solenoid valve 24 and the solenoid valve 54, through the corresponding electrical lines 65, 66, to open or close.

The transfer pump 50 discharges to an outlet conduit 68 having a pressure gauge 70 attached thereto, proximate to the outlet of the transfer pump 50, for measuring the pump outlet pressure. A valve 72 is attached to the outlet conduit 68, downstream of the pressure gauge 70, for controlling the flow rate of the bilge water as it exits from the transfer pump 50.

A flexible conduit 74 is connected by one end to the valve 72 and at its other end to a main filter conduit 76, which branches out to two sub-conduits 78, 80 connected to a pair of conventional multi-bag filters 86, 88 that are arranged in parallel with one another. More particularly, the first sub-conduit 78 is connected to the inlet (not shown) of the upstream filter 86. The second sub-conduit 80 is connected to the inlet of the downstream filter 88. The sub-conduits 78, 80 each have an inlet control valve 82, 84 connected thereto for additional control of the flow rate of the bilge water into the filters 86, 88.

The filters 86, 88 remove residual oil and particulates, having diameters of approximately 5 microns or larger, from the bilge water. More specifically, each filter 86, 88 is a multi-bag filter, such as a Loeffler filter Model MBF that is equipped with multiple 5 micron filter bags made of non-woven polypropylene and having an affinity for oil and light volatile organics, including benzene, toluene, ethylene and xylene. Such filter bags are commercially available, for example, from Hayward Industries, Inc. of Elizabeth, N.J.

Each of the filters 86, 88 discharges into a sub-conduit 90, 92, respectively. A valve 94, 96 is connected to each sub-conduit 90, 92, respectively, for controlling the flow rate of the bilge water exiting each of the filters 86, 88 and discharging into a filter outlet conduit 98. A conventional oil in water sensor 100, such Model BA-200 from Inventive Systems, Inc. of Lexington Park, Md., is connected to the filter outlet conduit 98 downstream of the sub-conduits 90, 92. The oil in water sensor 100 measures the oil content, in parts per million (ppm), of the bilge water as it exits from the filters 86, 88.

A conventional differential pressure gauge 102 is connected, by small feed lines 104, 106, bridging the main filter conduit 76 and the filter outlet conduit 98, as follows. The feed lines 104, 106 preferably each have a diameter of approximately four inches inches. One feed line 104 is connected to the differential pressure gauge 102 and to the main filter conduit 76, intermediate of the first and second sub-conduits 78, 80. Another feed line 106 is connected to the differential pressure gauge 102 and to the filter outlet conduit 98, intermediate sub-conduits 90, 92. By the foregoing configuration, the differential pressure gauge 102 measures the pressure drop across the filters 86, 88 for the purpose of ascertaining when the filter media needs to be cleaned or changed.

A flexible conduit 108 the filter outlet conduit 98 to a main carbon tank inlet conduit 110 that branches into inlet conduits 112, 114, each of which is connected to the inlet (not shown) of a conventional carbon adsorption tank 116, 118. Each inlet conduit 112, 114 has a valve 120, 122 connected thereto, proximate to the carbon tanks 116, 118, respectively, to control the flow rate of the bilge water into each of the carbon tanks 116, 118.

The carbon tanks 116, 118 are conventional three thousand pound tanks that are commercially available, for example, from Calgon of Pittsburgh, Pa. and U.S. Filter of Warren, N.J. The carbon tanks 116, 118 are arranged in parallel with one another and remove additional residual volatile organic compounds, such as benzene, toluene, ethylene and xylene, from the bilge water by a conventional, well-known carbon adsorption process.

Each carbon tank 116, 118 discharges into a short conduit 124, 126, respectively. A valve 128, 130 is connected to each short conduit 124, 126, respectively, to control the flow rate of the bilge water exiting each carbon tank 116, 118, respectively. The downstream ends of the short conduits 124, 126 converge into a booster pump conduit 132, which connects to a booster pump 134 that is powered by a hydraulic motor (not shown). The booster pump 134 discharges into a pump outlet conduit 136 which has a pressure gauge 138 connected thereto for the purpose of measuring the booster pump outlet pressure. A valve 140 on the pump outlet conduit 136 controls the flow rate of the bilge water exiting the booster pump 134.

A flexible conduit 142 connects the pump outlet conduit 136 to a downstream resin tank conduit 144. Intermediate of the ends of the flexible conduit 142, an upstream resin tank conduit 146 is connected thereto. The downstream resin tank conduit 144 is connected to a downstream pair of resin tanks 148. The upstream resin tank conduit 146 is connected to an upstream pair of resin tanks 150. Each resin tank conduit 144, 146 has a valve 152, 154, respectively, connected thereto for controlling the flow rate of the bilge water into each corresponding pair of resin tanks 148, 150.

The resin tanks 156, 158, 160, 162 are substantially identical to one another and are conventional three thousand pound tanks that are commercially available from U.S. Filter of Warren, N.J. The resin tanks 156, 158, 160, 162 contain anionic resin, which is also available from U.S. Filter, to remove heavy metals, such as lead, zinc, cadmium, tin, selenium, chromium, nickel and mercury, from the bilge water by a well-known, conventional cation/anion exchange process.

More particularly, the upstream resin tank conduit 146 is connected to the inlet (not shown) of the first resin tank 160 of the upstream pair of resin tanks 150. The outlet (not shown) of the first resin tank 160 has one end of an intermediate conduit 164 connected thereto. The other end of the intermediate conduit 164 is connected to the inlet (not shown) of the second resin tank 162 of the upstream pair of resin tanks 150. The intermediate conduit 164 also has a valve 166 connected thereto for controlling the flow rate of the bilge water into the second resin tank 162. A discharge conduit 168, having a valve 170 connected thereto, is connected to the outlet (not shown) of the second resin tank 162. The valve 170 controls the flow rate of the bilge water exiting from the upstream pair of resin tanks 150.

Similar to the arrangement of the upstream pair of resin tanks 150, the downstream resin tank conduit 144 is connected to the inlet (not shown) of the first resin tank 156 of the downstream pair of resin tanks 148. The outlet (not shown) of the first resin tank 156 has one end of an intermediate conduit 172 connected thereto. The other end of the intermediate conduit 172 is connected to the inlet (not shown) of the second resin tank 158 of the downstream pair of resin tanks 148. The intermediate conduit 172 also has a valve 174 connected thereto for controlling the flow rate of the bilge water into the second resin tank 158. A discharge conduit 176, having a valve 178 connected thereto, is connected to the outlet (not shown) of the second resin tank 158. The valve 178 controls the flow rate of the bilge water exiting from the downstream pair of resin tanks 148.

Each resin tank 156, 158, 160, 162 within the downstream and upstream pair of resin tanks 148, 150, respectively, is arranged in series with one another. The pairs of resin tanks 148, 150 are, however, arranged in parallel with one another. By this arrangement, the size of the resin tanks 156, 158, 160, 162 required can be reduced since each pair of resin tanks 148, 150 is required to process a bilge water stream comprising only approximately one half of the overall system flow rate. Nonetheless, since the resin tanks 156, 158, 160, 162 within each pair of resin tanks 148, 150 respectively, are arranged in series, each stream of bilge water will be exposed to the cation/anion exchange process twice before leaving the system 10.

Associative Organization of the Components of the Present Invention

Having described the sequential organization of the apparatus of the present invention, the associative organization of the apparatus will now be discussed. Referring still to FIG. 1, the components of the system 10 are grouped into six modules 180, 182, 184, 186, 188, 190, shown by the dofted lines. The portability and ease of assembly of the system 10 is facilitated by the associative organization of the components into the modules 180, 182, 184, 186, 188, 190, as well as the selection of components of predetermined sizes. For example, each of the modules 180, 182, 184, 186, 188, 190 is sized and shaped to allow shipment as regular commercial air cargo. A description of the organization, sizing and functioning of each of the modules 180, 182, 184, 186, 188, 190 follows.

FIGS. 2A–7B show the modules 180, 182, 184, 186, 188, 190 of the system 10 of the present invention, in somewhat more realistic form so as to demonstrate the arrangement of each of the major components within the modules 180, 182, 184, 186, 188, 190. Where the components that are shown in FIGS. 2A–7B are the same as those already shown in FIG. 1, such features are labeled having the same reference numbers as in FIG. 1.

Figure 2A:
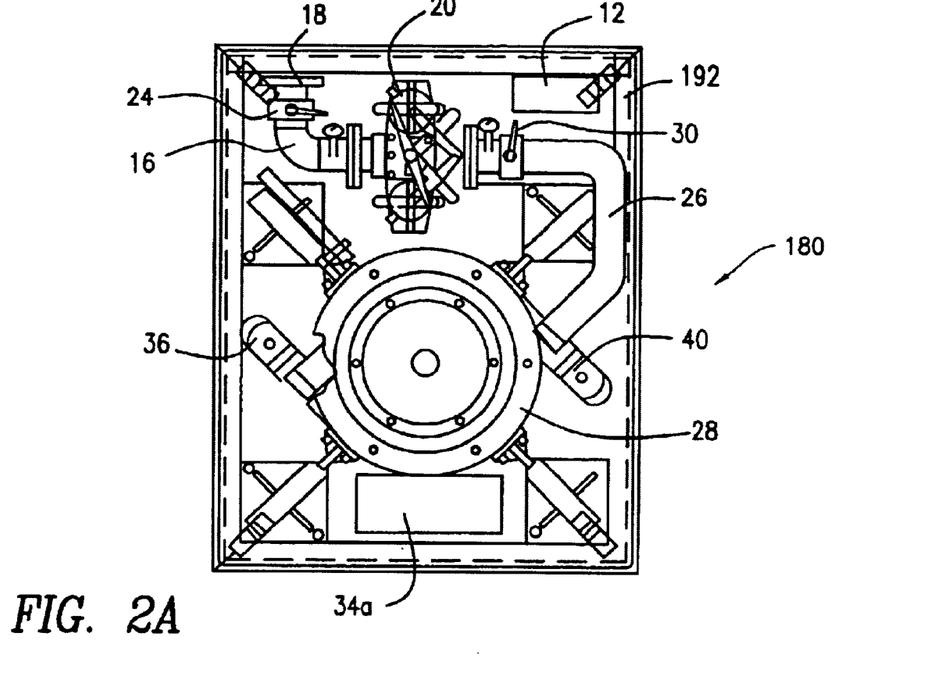
FIG. 2A is a top plan view of the first module of the system of FIG. 1, showing the arrangement of the system components therein.
Figure 2B:
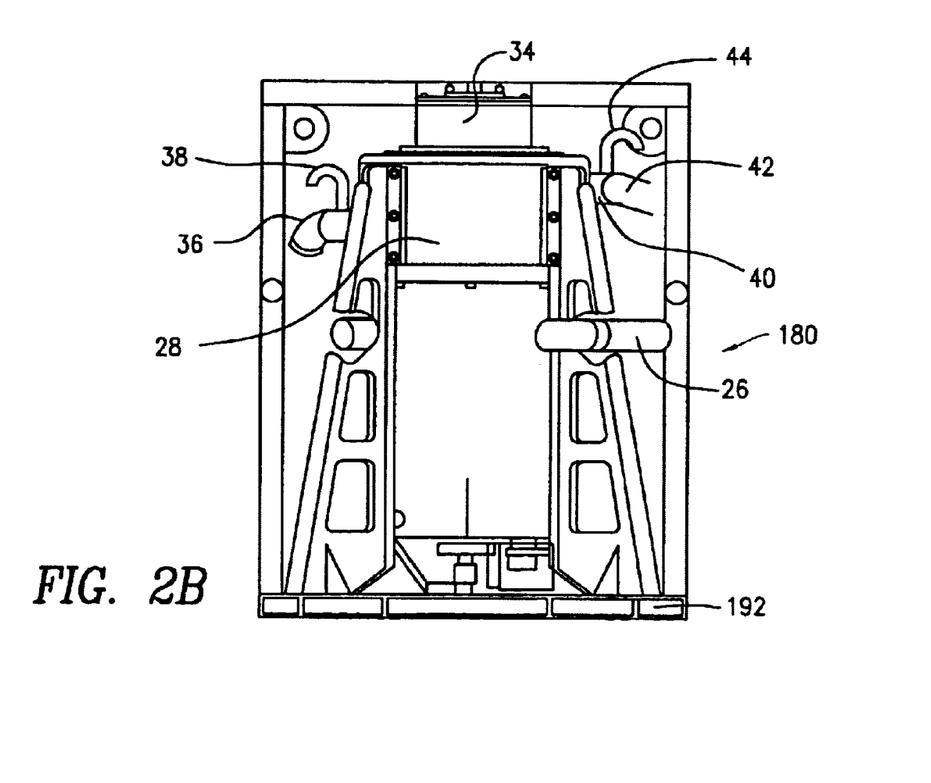
FIG. 2B is an elevational side view of the first module shown in FIG. 2A.

Referring now specifically to FIGS. 2A and 2B, the first module 180 includes the control panel 12, the strainer 20, the separator conduit 26 and the oil-water separator 28. These components are each mounted onto a skid 192 so they can be transported together as a unit, along with the hydraulic motor 34, the conduits 16, 26, 36, 40, the pressure gauge 22, the valves 24, 30 and the totalizer/flowmeter 32 (shown schematically in FIG. 1). The hydraulic motor 34 that powers the oil-water separator 28 is stored during shipping or transit in a storage area 34a (see FIG. 2A) that is provided on the skid 192. In FIG. 2B, the hydraulic motor 34 is shown in phantom assembled onto the oil-water separator 28. While the specific dimensions of the first module 180 could be varied widely, one exemplary embodiment thereof has a skid 192 with a width of approximately sixty inches and a length of approximately seventy-six inches. When shipped, the example of the first module 180 can packed into a crate having the skid 192 as its base and having a height of approximately seventy-seven inches.

Figure 3A:
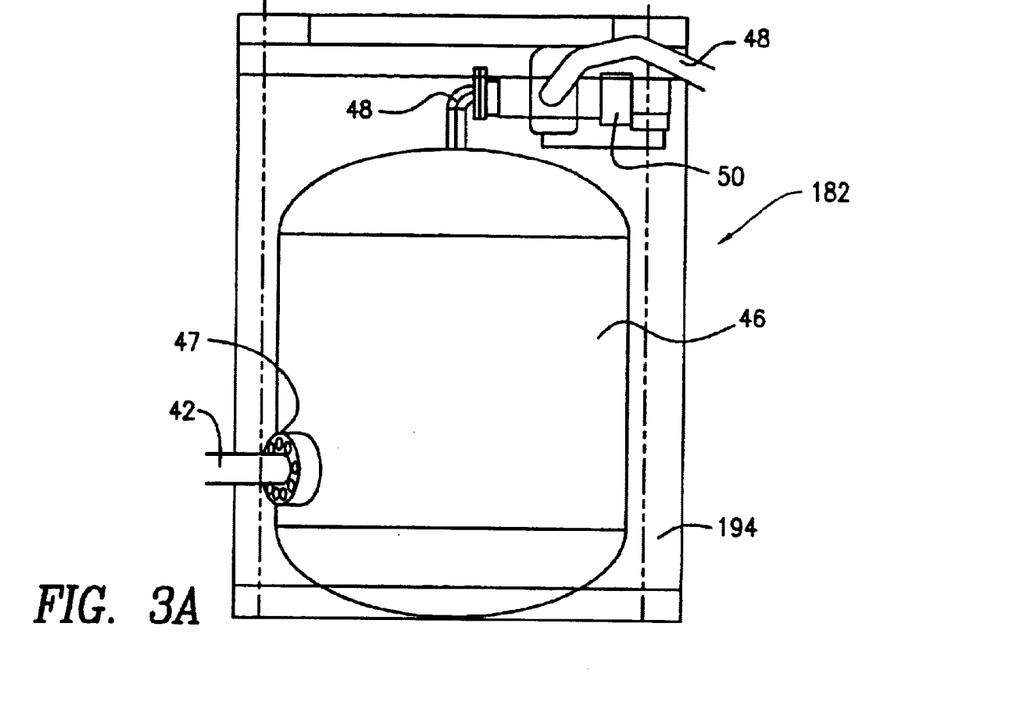
FIG. 3A is a top plan view of the second module of the system of FIG. 1, showing the arrangement of the system components therein.
Figure 3B:
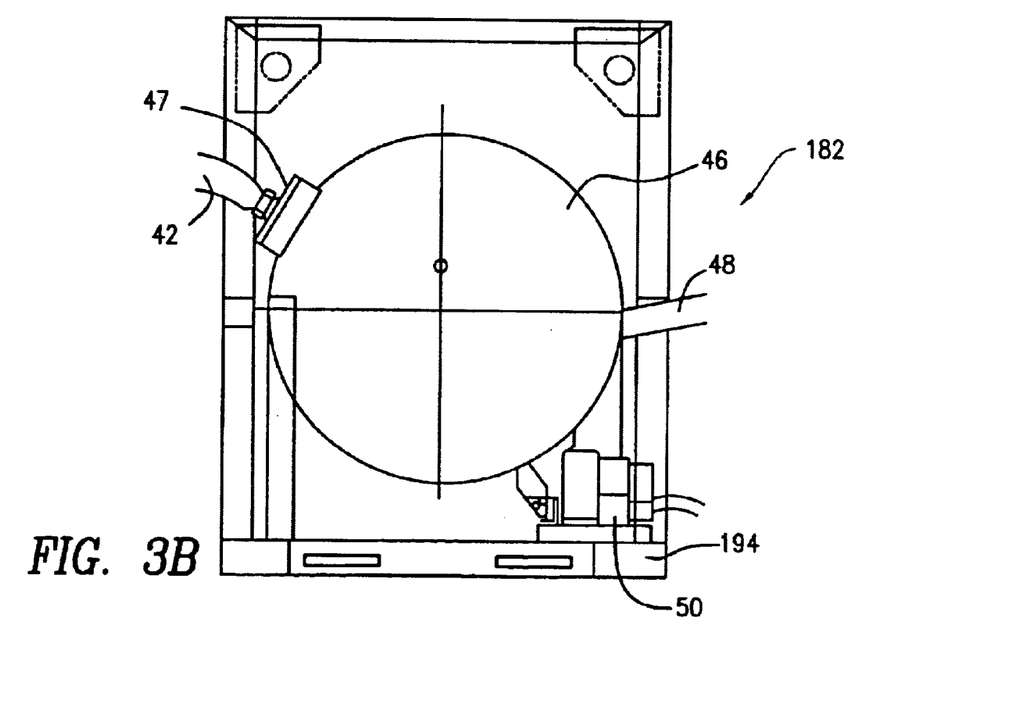
FIG. 3B is an elevational side view of the second module shown in FIG. 3A.

With reference now to FIGS. 3A and 3B, the second module 182 includes the atmospheric transfer tank 46, the transfer pump 50 and the hydraulic motor 52 (not shown). The atmospheric transfer tank 46, the transfer pump 50 and the hydraulic motor 52 are each mounted onto a skid 194, having a width of approximately sixty inches and a length of approximately eighty-five inches. The second module 182 also includes the high and low level switches 60, 62 of the transfer tank 46, as well as the pump conduit 48, the valves 54, 56, 72, the pump outlet conduit 68 and the pressure gauge 70 (shown schematically in FIG. 1). When shipped, the second module 182 may be packed into a crate having the skid 194 as its base and having a height of approximately seventy-seven inches.

Figure 4A:
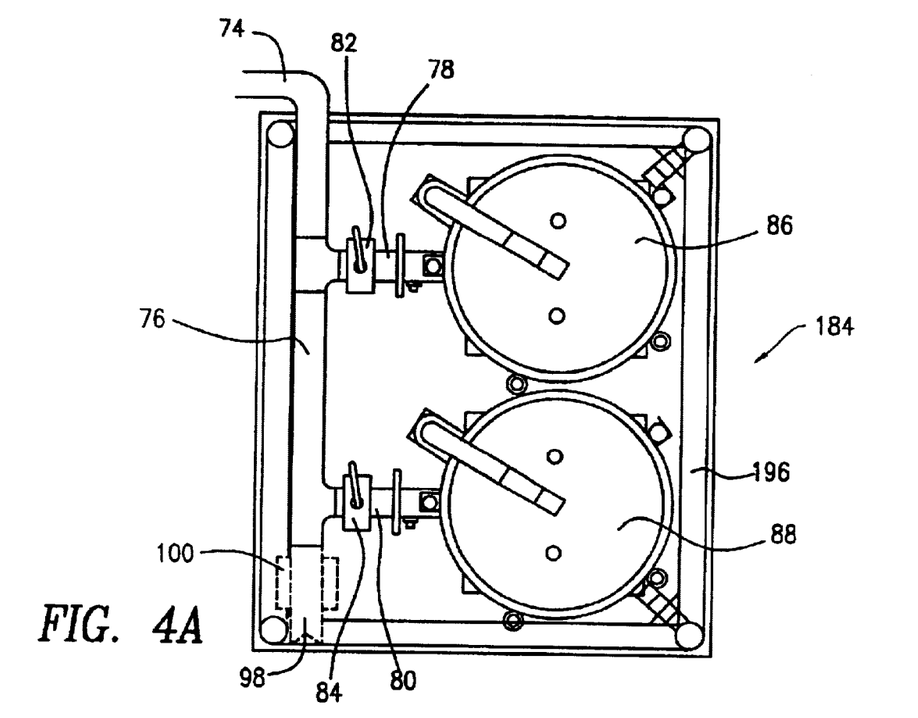
FIG. 4A is a top plan view of the third module of the system of FIG. 1, showing the arrangement of the system components therein.
Figure 4B:
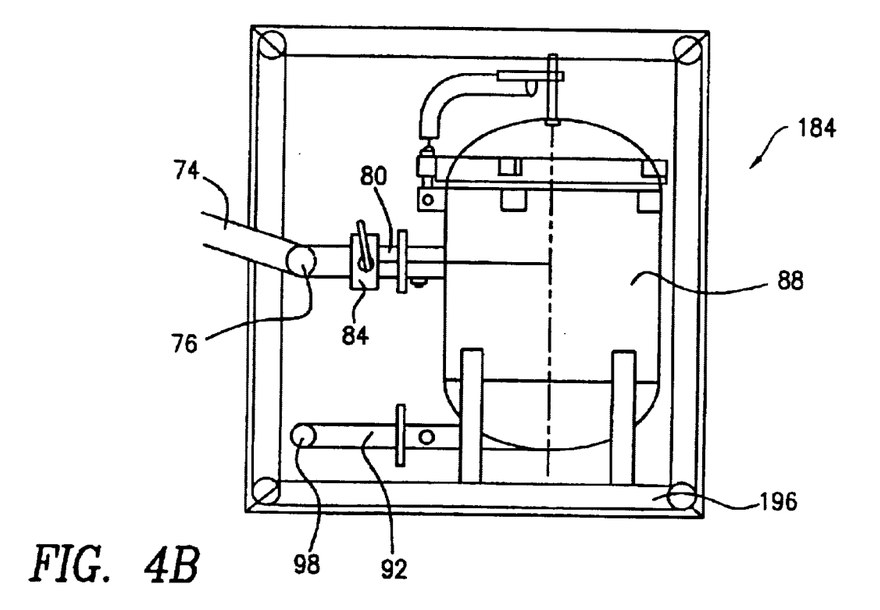
FIG. 4B is an elevational side view of the third module shown in FIG. 4A.

Referring to FIGS. 4A and 4B, the third module 184 includes the resin tanks 86, 88 mounted side-by-side onto a skid 196. The third module 184 also includes the main filter conduit 76, the filter outlet conduit 98, the sub-conduits 78, 80, 90, 92, the valves 82, 84, 94, 96 and the oil in water sensor 100 (note: not all elements referred to are shown in FIGS. 4A and 4B). In addition, the third module 184 includes the differential pressure gauge 102 and the small feed lines 102 that connect the gauge 102 to the main filter conduit 76 and the filter outlet conduit 98 (shown schematically in FIG. 1). The third skid 196 has a width of approximately fifty-five inches and a length of approximately sixty-seven inches. When shipped, the third module 184 can be packed into a crate having the skid 196 as its base and having a height of approximately sixty inches.

Figure 5A:
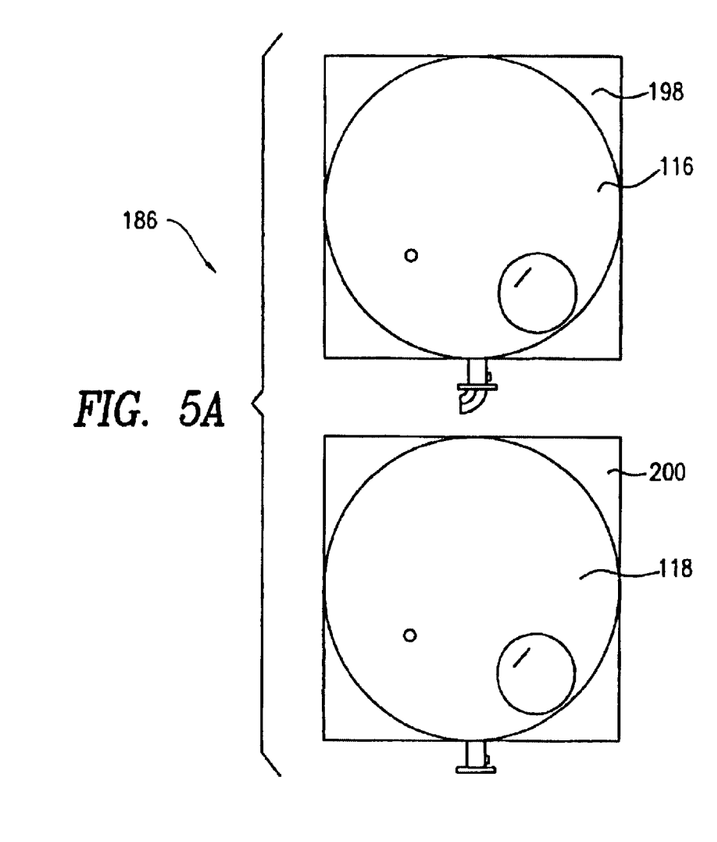
FIG. 5A is a top plan view of the fourth module of the system of FIG. 1, showing the arrangement of the system components therein.
Figure 5B:
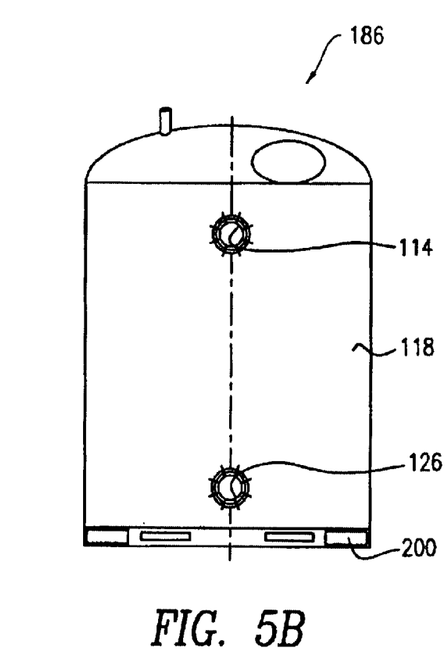
FIG. 5B is an elevational side view of the fourth module shown in FIG. 5A.

With reference specifically now to FIGS. 5A and 5B, the forth module includes the carbon tanks 116, 118, as well as the main carbon tank inlet conduit 110, the short conduits 112, 114, 124, 126 and the valves 120, 122, 128, 130 (see FIG. 1). Each of the carbon tanks 116, 118 is mounted onto a skid 198, 200, respectively, for easy transportation and shipping. Each skid 198, 200 is square-shaped with sides measuring approximately sixty inches each. The carbon tanks 116, 118, mounted on the skids 198, 200, are not typically shipped in crates. Furthermore, during installation and assembly of the system 10, the carbon tanks 116, 118 are arranged side-by-side, about a foot apart, as shown in FIG. 5A, such that they cover an area of approximately five feet (sixty inches) by eleven feet (one hundred thirty-two inches).

Figure 6A:
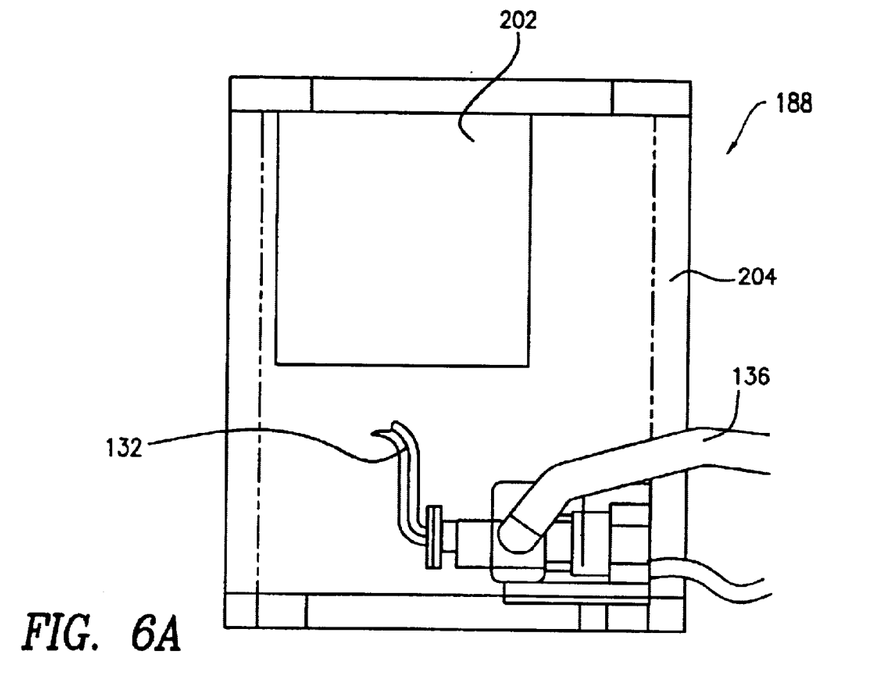
FIG. 6A is a top plan view of the fifth module of the system of FIG. 1, showing the arrangement of the system components therein.
Figure 6B:
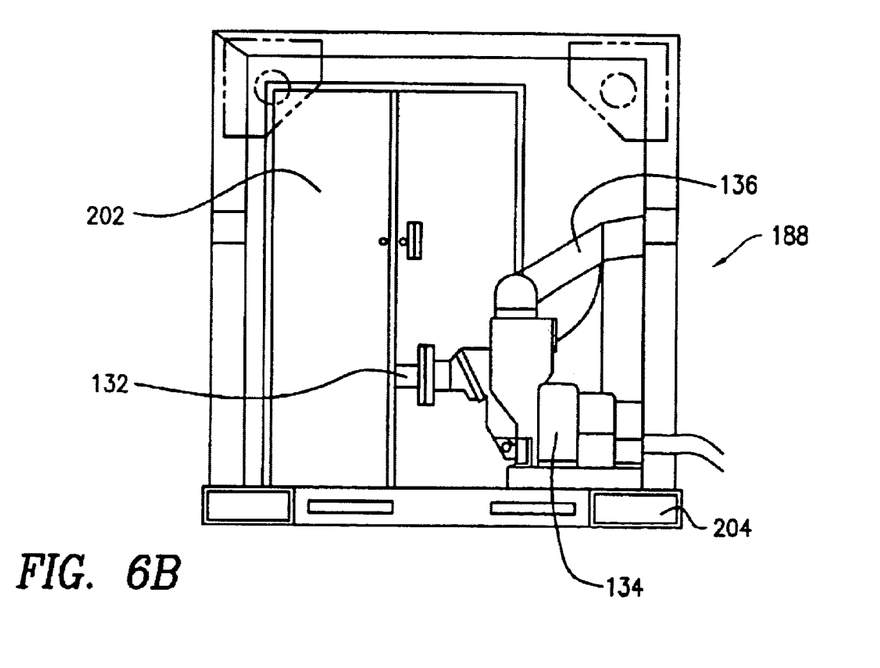
FIG. 6B is an elevational side view of the fifth module shown in FIG. 6A.

The fifth module 188 is shown in FIGS. 6A and 6B and includes the booster pump 134 and a hose storage cabinet 202 for storing the flexible conduits 42, 74, 108, 142 and other items, as necessary. The fifth module 188 also includes the booster pump conduit 132, the pump outlet conduit 136, the pressure gauge 138 and the valve 140 (see FIG. 1). The booster pump 134 and the cabinet 202 are mounted onto a skid 204 that is approximately fifty-five inches wide and approximately sixty-seven inches long. When shipped, the fifth module 188 can be packed into a crate having the skid 204 as its base and having a height of approximately sixty inches.

Figure 7A:
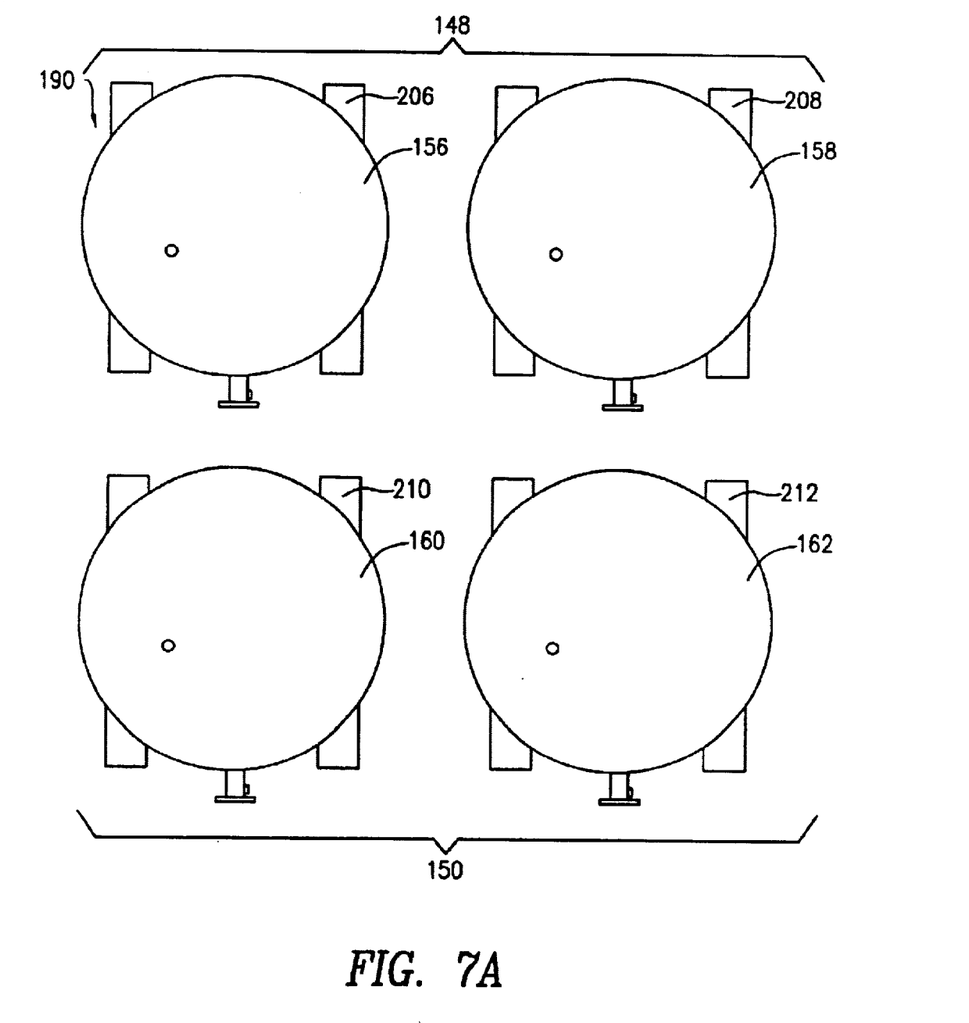
FIG. 7A is a top plan view of the sixth module of the system of FIG. 1, showing the arrangement of the system components therein.
Figure 7B:
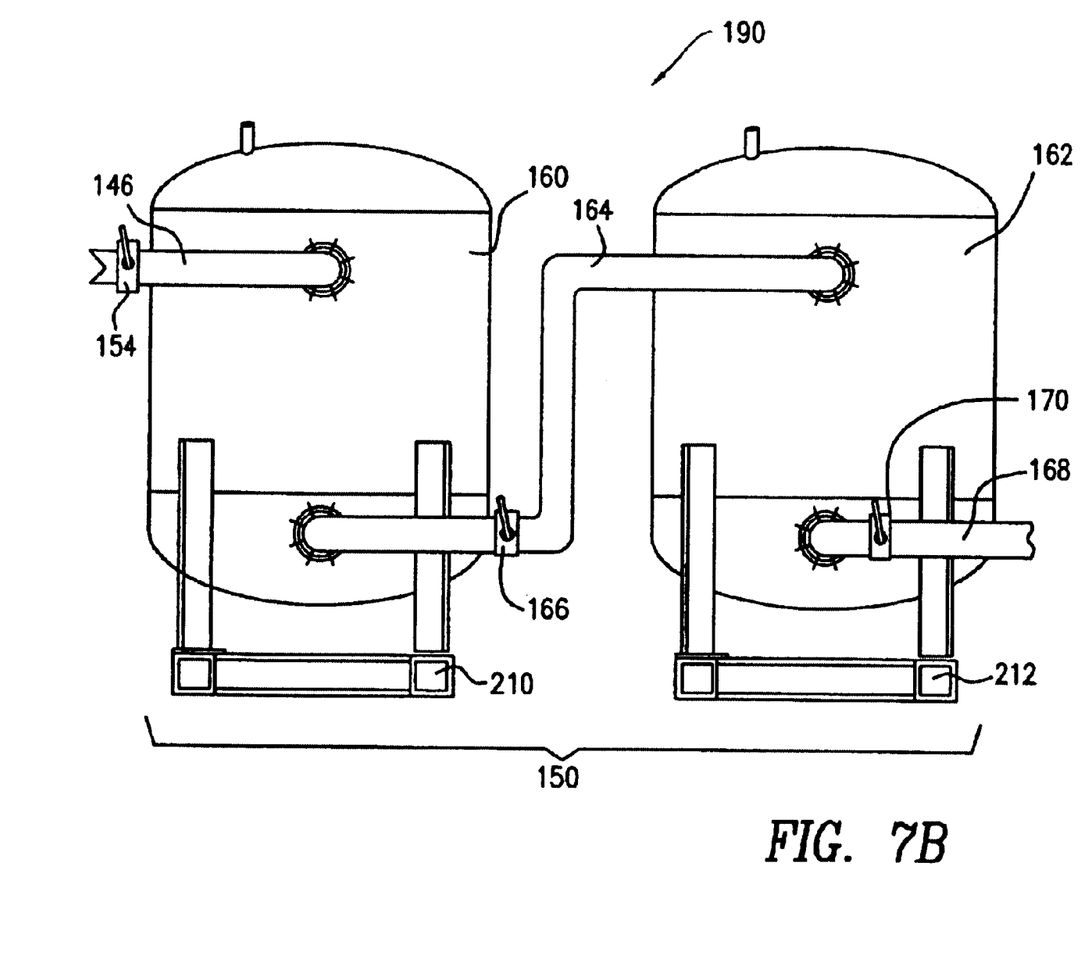
FIG. 7B is an elevational side view of the sixth module shown in FIG. 7A.

With reference now to FIGS. 7A and 7B, the sixth module 190 of the system 10 includes the two pairs of resin tanks 148, 150, along with the associated downstream and upstream resin tank conduits 144, 146, the valves 152, 154, 174, 178, 166, 170, the intermediate conduits 172, 164 and the discharge conduits 176, 170. Each of the resin tanks 156, 158, 160, 162 is mounted to a separate skid 206, 208, 210, 212, to facilitate shipping and installation. Each of the skids 206, 208, 210, 212 is square shaped and has sides of approximately forty-two inches in length. The resin tanks 156, 158, 160, 162, mounted on the skids 206, 208, 210, 212, are not typically shipped in crates. Furthermore, during installation and assembly of the system 10, the resin tanks 156, 158, 160, 162 are arranged in side-by-side pairs to form a small tank farm, as shown in FIG. 7A, such that they cover an area of approximately ten and a half feet square (i.e., approximately one hundred twenty-six inches by one hundred twenty-six inches).

Once the system 10 is shipped to the desired location and loaded onto a ship, the individual skids 192, 194, 196, 198, 200, 204, 206, 208, 210, 212 must be arranged and connected to one another in the proper sequence, as described above in connection with FIGS. 1–7B, in order for the system 10 to be operable. Referring back to FIG. 1, as can be understood from the earlier description of the individual components of the system 10, many of the conduits of the system 10 serve to connect the modules 180, 182, 184, 186, 188, 190 in the proper sequence to form a fluid circuit. By way of review, it should be noted that the flexible conduits 42, 74, are used to connect the first, second and third modules 180, 182, 184 (each mounted on individual skids 192, 194, 196) to one another in sequence. The flexible conduit 108 connects the third module 184 (mounted on the skid 196) to the carbon tank 116 (mounted on the skid 198) of the fourth module 184. Similarly, it should be noted that the carbon tanks 116, 118 (mounted on individual skids 198, 200) of the fourth module 186 are connected to one another by the main carbon tank inlet conduit 110. The other carbon tank 118 (mounted on skid 200) of the fourth module 186 is connected to the fifth module 188 (mounted on skid 204) by the booster pump conduit 132. Likewise, the flexible conduit 142 connects the fifth module 188 (mounted on skid 204) to the first resin tank 156, 160 (mounted on individual skids 206, 210) of each pair of resin tanks 148, 150 of the sixth module 190. Lastly, the intermediate conduits 174, 164 connect the first resin tank 156, 160 (mounted on individual skids 206, 210) of each pair of resin tanks 148, 150 to the corresponding second resin tank 158, 162 (mounted on skids 208, 212) of each pair of resin tanks 148, 150.

To facilitate the aforesaid sequential connection of the components on each of the skids 192, 194, 196, 198, 200, 204, 206, 208, 210, 212, during assembly of the system 10, the components are provided with color- and number-coding. For example, to facilitate the connection of the flexible conduit 74 correctly with the second and third modules 182, 184, red paint is applied to a small area on each end of the flexible conduit 74, as well as on a small area of the outlet conduit 68 of the transfer pump 50 that is mounted on the skid 194 of the second module 182 and also on a small area of the upstream end of the main filter conduit 76 of the third module 184 (mounted on skid 196). In addition, if the ends of the flexible conduit 74 are not equally adapted to connecting to the outlet conduit 68 and the main filter conduit 76, a numbering system or symbols can be utilized. For example, if one end of the flexible conduit 74 must be connected to the main filter conduit 76, then a number or symbol can be affixed to the end of the flexible conduit 74, as well as the upstream end of the main filter conduit 76. Similar color- and number-coding can be applied throughout the system 10 to ensure that the components of the system will be properly, sequentially connected with one another.

Likewise, the connections between the hydraulic motors 34, 52 of the system 10 and the ship's hydraulic system, as well as the electrical connections between the control panel 12 and the various above-described electrical components and lines (e.g., the electrically controlled air solenoid valve 24, the solenoid 54 of the transfer pump 50 and the high and low level switches 60, 62 of the transfer tank 46), can be color- and number-coded to ensure proper connections are established.

Having described above the most significant individual components of the system 10, as well as their associative organization, the assembly, start-up and operation of the system 10 to decontaminate bilge water on board a ship will now be described.

Operation of the Present Invention

As explained above, the components of the system 10, organized into modules 180, 182, 184, 186, 188, 190 and mounted onto the skids 192, 194, 196, 198, 200, 204, 206, 208, 210, 212, are sized such that they can be shipped as commercial air freight and easily loaded by conventional cargo cranes onto a ship where the system 10 is to be used. It should be noted that all ships have hydraulic and electrical systems that can be connected, in a known conventional manner, to the hydraulic and electrical components of the system 10 to provide hydraulic and electric power as necessary. For example, the hydraulic motor 52 of the transfer pump 50 can be connected to the ship's hydraulic power system and the control panel 12 may be powered by the electrical system of the ship.

The following description discusses the assembly of the system 10. Once the system 10 has been delivered and loaded onto a ship, the skids 192, 194, 196, 198, 200, 204, 206, 208, 210, 212 should be arranged on the ship, proximate to the aforementioned hydraulic and electrical power sources, as discussed above in connection with the modules 180, 182, 184, 186, 188, 190. Then, the modules 180, 182, 184, 186, 188, 190 should be connected to one another, in the proper sequence described above in connection with FIGS. 1–7B, using the above-described color- and number-coding systems. Once the system 10 is delivered and properly assembled, the following start-up procedure is followed.

After all of the conduit, hydraulic and electrical connections are made, the power to the control panel 12 should be switched on. The totalizer./flowmeter 32 should be reset to zero. Before proceeding further, it should be confirmed that the inlet pressure is at least approximately forty psi, as measured by the pressure gauge 22 on the inlet conduit 16. If the inlet pressure if forty psi or greater, the air solenoid valve 24 should be opened and the components of the first module 180 should be checked for leaks.

Once the foregoing steps have been taken, all of the remaining valves 30, 54, 56, 72, 82, 84, 94, 96, 120, 122, 128, 130, 140, 152, 154, 166, 170, 174, 178 of the system 10 should then be opened. The hydraulic power supply for the hydraulic motor 34 of the oil-water separator 28, the hydraulic motor 52 of the transfer pump 50 and the hydraulic motor (not shown) of the booster pump 134. The outlet pressure at each of the pumps 50, 134 should be at least approximately forty-five psi, as measured by the pressure gauges 70, 138.

The totalizer/flowmeter 32 should be checked at this point to verify that the flow rate of the bilge water from the strainer 20 is approximately two hundred USGPM. In addition, during the continuous operation of the system 10, the flow meter 32 and the pressure gauges 22, 70, 102, 138 should be checked periodically to ensure that the system operating conditions remain within the design limits that were discussed previously at the beginning of this detailed disclosure.

After the foregoing assembly and start-up procedures have been completed, the system 10 can be operated continuously to treat and decontaminate the bilge water as follows. The contaminated bilge water flows into the end 18 of the inlet conduit 16 at a rate of approximately two hundred (200) USGPM. The bilge water next flows through the strainer 20, wherein solids having diameters of approximately one sixteenth of an inch or larger are physically trapped and removed from the bilge water. The bilge water flows out of the strainer 20, through the separator conduit 26 and into the oil-water separator 28, wherein most of the oil and grease is removed centrifugally. The separated oil, also referred to as the light phase liquid, is transported away from the oil-water separator 28 via the oily waste conduit 36 to a collection container (not shown) for later disposal, in accordance with the applicable regulations. The bilge water, also known as the heavy phase liquid, is transported via the short conduit 40 and the first flexible conduit 44 to the transfer tank 46 of the second module 182. Depending upon the degree of oil contamination, the volume of the bilge water exiting the oil-water separator 28 will be reduced such that the flow rate may be as low as approximately 170 USGPM.

As the bilge water enters the transfer tank 46, it passes through the hydro-sieve 47 that is located at the inlet (not shown) of the transfer tank 46. As described earlier, the hydro-sieve accomplishes the removal or reduction of two categories of contaminants—smaller suspended solids that are not caught by the strainer 20 and the chemical constituents of AFFF and emulsion agents. More particularly, the hydro-sieve 47 encourages any foaming or emulsion agents (e.g. AFFF) in the bilge water to foam up, which foam is then trapped, collected and removed by the hydro-sieve, with the suspended solids, to another waste container (not shown).

The transfer pump 50 extracts the bilge water from the transfer tank 46 and pumps it through the flexible conduit 74, to the filters 86, 88 of the third module 184. The bilge water stream is split at the main filter inlet conduit 76 into two streams of substantially equal volumes, each of which flows into one of the filters 86, 88 for processing. As already discussed briefly above, each of the filters 86, 88 has a plurality of 5 micron non-woven polypropylene filter bags with an affinity for oil. The bags aid in the removal of residual oil and particulates (with diameters of approximately 5 microns or larger) from the bilge water. The particular chemical contaminants removed by the filters 86, 88 include light volatile organics, such as benzene, toluene, ethylene and xylene. Since the filters 86, 88 are arranged in parallel with one another, each filter 86, 88 need only be large enough to accommodate one half of the total flow rate capacity of the system 10, or, in other words, approximately eighty-five to one hundred USGPM. When the differential pressure gauge 102 of the third module 184 measures a pressure drop of at least approximately fifteen psi, then the filter bags (not shown) of the filters 86, 88 must be replaced with new filter bags.

After the bilge water has passed through the filters 86, 88, the two streams of bilge water are combined in the filter outlet conduit 98 and flow through the oil in water sensor 100, which measures the light organic compound content of the bilge water. The light organic compound content of the bilge water must be fifteen ppm or less to meet the currently applicable wastewater discharge standards. If the light organic compound content of the bilge water exceeds fifteen ppm, the bilge water should not be permitted to enter the carbon tanks 116, 118 of the fourth module 186, but rather, the bilge water should be recycled back through the filters 86, 88 via a recycle conduit (not shown) connecting the filter outlet conduit 98 and the main filter conduit 76.

Assuming the light organic concentration of the bilge water measures fifteen ppm or less, the bilge water will flow from the filter outlet conduit 98, through the third flexible conduit 108, and into the fourth module 188 wherein the carbon tanks 116, 188 are located. The carbon tanks 116, 118 are also arranged in parallel with one another and, therefore, each carbon tank 116, 118 processes only half of the overall system 10 flow rate, or approximately eighty-five to one hundred USGPM. The bilge water stream is split into two streams of substantially equal volume at the main carbon tank inlet conduit 110. Each bilge water stream enters one of the carbon tanks 116, 118, wherein the concentration of light organic compounds (e.g., benzene, toluene, ethylene and xylene) is further reduced by a conventional, well-known carbon adsorption process. The two bilge water streams exit the carbon tanks 116, 118 and are recombined in the booster pump conduit 132. The booster pump 134 pumps the recombined bilge water stream into the flexible conduit 142 and into the sixth module 190, which includes the parallel pairs of resin tanks 148, 150.

The bilge water stream from the flexible conduit 142 is split into two streams of substantially equal volume at the upstream and downstream resin tank conduits 146, 144, respectively. Each bilge water stream enters one of the pairs of resin tanks 148, 150, wherein a known, conventional cation/anion exchange process removes, or reduces to acceptable levels, the contaminants, such as lead, zinc, cadmium, tin, selenium, chromium, nickel and mercury, from the bilge water. Since the pairs of resin tanks 148, 150 are arranged in parallel with one another, each pair 148, 150 processes only one half of the overall system 10 flow rate, or approximately eighty-five to one hundred USGPM. Furthermore, as described earlier herein, the resin tanks 156, 158, 160, 162 of each pair of resin tanks 148, 150, respectively, is arranged in series, which arrangement results in doubling the time during which the bilge water is exposed to the cation/anion exchange process, further resulting in further reduction of the metals from the bilge water, before the bilge water exits the system 10. It should be noted that each pair of resin tanks 148, 150 is provided with its own discharge conduit 176, 168, respectively, which conduits 176, 168 also serve as the system outlet conduits and discharge the decontaminated bilge water from the system 10, e.g., overboard.

The above-described sequential arrangement, organization and sizing of the components which facilitate transportation and efficient assembly of the system 10, as well as the removal, reduction and separation of multiple categories of contaminants, of the types described above, from the contaminated bilge water, under the above-specified conditions constitute aspects of the present invention.

It will be understood that the embodiments described herein are merely exemplary and that a person skilled in the art may make many variations and modifications without departing from the spirit and scope of the present invention. For instance, additional modules may be developed and added to the system 10 for the removal of additional categories of contaminants, such as aerobic and anaerobic microbes. Furthermore, additional conduits can be connected to the components for the recycling of bilge water to previous modules or bypassing certain modules. For example, a bypass conduit could be connected between the resin tank conduits 144, 146 and any one of the filter outlet conduit 98, the flexible conduit 108 or the main carbon tank inlet conduit 110. Such a bypass conduit would allow the bilge water to bypass the carbon tanks 116, 188 and flow directly to the resin tanks 156, 158, 160, 162 in the event that the reading of the sensor 100 indicated that processing by the carbon tanks 116, 118 was unnecessary because sufficient volatile organic compounds and residual oil had already been removed from the bilge water. Similarly a recycle conduit could be provided in connection with any of the processing components (e.g., between the filter outlet conduit 98 and the main filter conduit 76) so that the bilge water could be rerouted back through a particular decontamination process (e.g., the filters 86, 88) in the event the first pass-through failed to sufficiently remove or reduce the particular contaminants addressed thereby. All such variations and modifications are intended to be included within the scope of the invention.

I claim:

1. An apparatus for decontaminating bilge water contaminated with a foaming fire suppressant composition in the bilge of a ship that has recently experienced an on-board fire, comprising an inlet into which the contaminated water flows; an outlet from which decontaminated water is discharged; and a plurality of water processing modules, each having an independent support structure for holding at least one associated water processing device in a position suitable for transport to and operation at the site of the reservoir holding the contaminated water, said at least one associated water processing device of each of said plurality of modules being selectively and removably hydraulically connectable to another of said at least one associated water processing device of another of said plurality of modules to define a continuous flow path extending from said inlet, through said apparatus to said outlet, each of said at least one associated water processing devices having an associated decontamination function for at least partially removing a contaminant from a flow of the contaminated water passed sequentially through said plurality of modules along said flow path, a first of said at least one associated water processing devices including a sieve against which the flow is directed to induce foaming of the foaming agent, a second of said associated water processing devices including a holding tank, said sieve being positioned on an inlet side of said holding tank such that contaminated water flowing into said holding tank encounters said sieve before entering said holding tank, causing the foaming agent to foam and allowing the foam to be physically removed from the surface of said sieve, a third and a fourth of said associated water processing devices include a strainer for removing solid objects from the contaminated water and an oil/water separator, respectively, a fifth of said associated water processing devices include a bag filter for removing small particulates and hydrocarbons, a sixth of said associated water processing devices includes a carbon tank containing activated carbon for the adsorption of volatile organic compounds, a seventh of said associated water processing devices includes a resin tank containing anionic resin for removing metal contaminants from the contaminated water, wherein said strainer and said oil/water separator are supported on a first module, said holding tank with sieve are supported on a second module, said bag filter is supported on a third module, said carbon tank is supported on a fourth module, said resin tank is supported on a fifth module and said flow path proceeds from the first module to the second module to the third module to the fourth module to the fifth module.

2. The apparatus of claim 1, wherein said sieve is made from well screen.

3. The apparatus of claim 2, wherein said sieve is disposed at an angle of about sixty degrees above horizontal.

4. The apparatus of claim 2, wherein said flow path of the contaminated water is substantially perpendicular to said sieve.

5. The apparatus of claim 1, wherein the foam is removed from the surface of said sieve by gravity.

6. The apparatus of claim 1, wherein the foam is removed from the surface of said sieve by a flow of air.

7. The apparatus of claim 1, wherein said foam is directed to a collection container after being removed from the contaminated water.

8. The apparatus of claim 1, wherein said associated water processing devices are at least partially hydraulically connected one to another by flexible conduit to permit flexibility in positioning said plurality of modules relative to one another during use.

9. The apparatus of claim 8, wherein said associated water processing devices have indicia indicating a predetermined arrangement for connecting one to another.

10. The apparatus of claim 9, wherein said indicia is selected from color-coding and numbering.

11. The apparatus of claim 1, further including means for monitoring said fluid flow at a plurality of points along said flow path and means for controlling the flow rate of the water along said flow path.

12. The apparatus of claim 1, wherein said inlet is connectable to the ship's bilge pump system.

13. The apparatus of claim 1, further including means for monitoring the concentration of hydrocarbons in said contaminated water passing through said carbon tank and control means for recirculating said contaminated water back through said carbon tank for further reduction in hydrocarbon content.

14. The apparatus of claim 13, further including means for sensing the concentration of hydrocarbons in the contaminated water prior to entering said carbon tank and control means for shunting said contaminated water past said carbon tank if the concentration of hydrocarbons is not sufficient to require treatment in said carbon tank.

15. The apparatus of claim 1, wherein said bag filter, said carbon tank and said resin tank are each redundant units having a plurality of filters, carbon tanks, and resin tanks, respectively.

* * * * *